US012337888B2

(12) United States Patent
Johansson

(10) Patent No.: US 12,337,888 B2
(45) Date of Patent: Jun. 24, 2025

(54) TRANSPORT AID ARRANGEMENT AND A METHOD FOR USE OF A TRANSPORT AID ARRANGEMENT

(71) Applicant: CWT WORKTOOLS AB, Kil (SE)

(72) Inventor: Patrik Johansson, Karlstad (SE)

(73) Assignee: CWT WORKTOOLS AB, Kil (SE)

( * ) Notice: Subject to any disclaimer, the term of this patent is extended or adjusted under 35 U.S.C. 154(b) by 344 days.

(21) Appl. No.: 17/910,741

(22) PCT Filed: Mar. 11, 2021

(86) PCT No.: PCT/EP2021/056130
§ 371 (c)(1),
(2) Date: Sep. 9, 2022

(87) PCT Pub. No.: WO2021/180829
PCT Pub. Date: Sep. 16, 2021

(65) Prior Publication Data
US 2023/0087966 A1 Mar. 23, 2023

(30) Foreign Application Priority Data
Mar. 11, 2020 (SE) .................................. 2030073-7

(51) Int. Cl.
*B62B 3/10* (2006.01)
*B65G 7/08* (2006.01)
*B66C 13/08* (2006.01)

(52) U.S. Cl.
CPC .................. *B62B 3/10* (2013.01); *B65G 7/08* (2013.01); *B66C 13/08* (2013.01)

(58) Field of Classification Search
CPC .. B62B 3/10; B62B 3/108; B65G 7/08; B66C 13/08; B66C 13/108
See application file for complete search history.

(56) References Cited

U.S. PATENT DOCUMENTS 1,288,138 A * 12/1918 Nicoson .................... B23Q 1/28
269/296
3,083,840 A * 4/1963 Gibbs ....................... B66C 1/10
294/67.1

(Continued)

FOREIGN PATENT DOCUMENTS

NL   1 040 748   1/2016

OTHER PUBLICATIONS

International Search Report Issued in PCT/EP2021/056130, Jun. 21, 2021, pp. 1-2.

(Continued)

*Primary Examiner* — Brian L Swenson
(74) *Attorney, Agent, or Firm* — Jeffrey S. Melcher; Melcher Patent Law PLLC

(57) ABSTRACT

A transport aid arrangement having at least one support body (100) having at least one inner support surface (110B) and provided with a curved outer support surface (100A) arranged to be attached to a transport object (TO) enabling controlled pivoting of the transport object (TO) along the curved outer support surface (100A) from a vertical position into a horizontal position. The support body (100) creates a distance between the at least one inner support surface (110B) and an outer part of the curved outer support surface (100A). The support body (100) is divided into at least two body parts (110, 120), an inner body part (110) and an outer body part (120) each provided with a portion (110A, 120A) of the curved outer support surface (100A), releasably connectable with each other by a coupling (130). The width (WI) of the inner body part (110) is less than the total width (W) of the curved outer support surface (100A).

12 Claims, 5 Drawing Sheets

(56) References Cited

U.S. PATENT DOCUMENTS

| | | | | |
|---|---|---|---|---|
| 3,680,715 A | * | 8/1972 | Montgomery | B62B 3/108 |
| | | | | 280/47.12 |
| 3,702,660 A | * | 11/1972 | Berger | B65G 7/08 |
| | | | | 414/420 |
| 3,744,812 A | | 7/1973 | Langhausen | |
| 4,315,711 A | * | 2/1982 | Koscho | B65G 65/24 |
| | | | | 211/49.1 |
| 4,498,841 A | * | 2/1985 | Wickstrom | B65G 7/08 |
| | | | | 280/47.12 |
| 5,755,816 A | * | 5/1998 | Schirmer | B65G 7/08 |
| | | | | 414/782 |
| 9,139,262 B1 | * | 9/2015 | Skaggs | B63B 35/30 |
| 2003/0127834 A1 | * | 7/2003 | Click | B62B 3/108 |
| | | | | 280/651 |
| 2010/0034632 A1 | * | 2/2010 | Park | B65G 7/08 |
| | | | | 414/781 |
| 2015/0259003 A1 | * | 9/2015 | Septimio | B62B 3/06 |
| | | | | 280/47.18 |
| 2020/0130960 A1 | * | 4/2020 | Hove | B66F 7/22 |

OTHER PUBLICATIONS

Written Opinion Issued in PCT/EP2021/056130, Jun. 21, 2021, pp. 1-5.

\* cited by examiner

TRANSPORT AID ARRANGEMENT AND A METHOD FOR USE OF A TRANSPORT AID ARRANGEMENT

TECHNICAL FIELD

The present invention relates to a transport aid arrangement, comprising at least one support body having at least one inner support surface and provided with a curved outer support surface arranged to be attached to a transport object enabling controlled pivoting of the transport object along said curved outer support surface from a vertical position into a horizontal position.

BACKGROUND ART

In many situations there are problems in transporting objects in a cost-efficient manner, e.g. large objects such as tables. There is often difficulties in moving bulky and/or heavy objects into desired positions within a facility. In many occasions there is a need of some machinery to assist in lifting and transporting the voluminous/bulky object within a facility to have it positioned in the desired position. Furthermore, this especially relates to objects that are relatively heavy and that may not be easily moved or that may not easily have its position changed manually. In that regard there is often a need of lifting and handling equipment that may be difficult to handle and/or be costly and/or provide logistic problems.

One exemplary object related to the above problems is flat bed applicators. A flat bed applicator comprises a large table and a relatively heavy structure around that table to enable movement of a roll and carrying other equipment connected thereto. Normally there will be a need for some kind of lifting and transporting machinery to move around such a flatbed applicator. An alternative, to possibly avoid need of lifting and transporting machinery, relies in supplying/transporting the object in parts, which may provide a compact package that is easier to move around, e.g. by use of conventional wheel equipped transport aids, whereby the object may be pushed into the desired position. However, the latter alternative requires assembly of the object in situ, which not always is desired, especially if the object includes sophisticated interacting details that must be assembled in a specific manner.

Accordingly, there is an advantage to be able to supply objects including sophisticated interacting details pre-assembled, i.e. assembled by experts, in order to meet expectations regarding quality, reliability, ease of use, etc. However, as mentioned above there is the negative fact that pre-assembled objects normally are space occupying, which will add cost for transportation and also make it more difficult to move objects around within a facility, normally also requiring machinery for movement thereof.

Transport aid arrangement are known intended to, at least partly, solve at least some of the problems mentioned above. From U.S. Pat. No. 3,744,812 there is known a transport aid arrangement, whereby one man can load and transport a vertically tipped pool table and the like, on a hand-propelled dollie, which provides opposed table bracing upright portions and a mobile base for manual movement. The dollie has a rocker mounted thereon, for unloading of the table. The rocker 70 includes a pair of laterally spaced vertically arcuate and outwardly convex arms 72, enabling controlled pivoting of the table into its horizontal user position. However, the rocker is relatively space consuming since the curvature needs to be relatively large, which may make it difficult, or even impossible to move it through a normal door opening.

From EP0863092 there is known a piano transport aid arrangement including a support that allows tilting of the piano from a normal position where it is mounted on its feet, to a position where it is supported on one of its side faces and vice versa. The support has tilting guides, including a main tilting support having a tilting ramp of curved shape, so that the tilting may take place, at least in part, under the effect of the gravity forces, requiring only reduced manual assistance. However, the support is relatively space consuming since the curvature needs to be relatively large, which may make it difficult, or even impossible to move it through a normal door opening.

SUMMARY OF THE INVENTION

According to one aspect of the present invention, one object of the invention is to provide a more compact transport aid arrangement, which is achieved with a transport aid arrangement according to claim 1.

Thanks to the invention a very compact design is provided which may also provide many other advantages, e.g.;
  ease of use,
  easy movement through narrow passages, e.g. doors and the like,
  easy movement manually without need of motorized lifting devices/equipment,
  cost-efficient transportation of relatively bulky and heavy objects—
Further preferred aspects of the invention may be that;
  said coupling is arranged with a plurality of interfit members that enables the outer body part to be attached to the inner body part in at least two different positions, which provides the advantage that the transport object may be smoothly pivoted onto a floor also if it is positioned at a higher level than the floor/ground, e.g. on a bottom of a transport package, e.g. a pallet.
  said coupling comprises two parallel plates extending laterally in relation to a first support edge of the outer body part and that the inner body part is arranged with a plate-like structure intended for interaction with said parallel plates and an adapted second support edge arranged to interact with said first support edge, whereby the coupling provides a lateral support between the inner and outer body parts along a dividing line of the two body parts, wherein preferably said body parts are plate-shaped, preferably made of some kind of wooden material which provides the advantage that a reliable and cost-effective coupling is provided.
  said outer body part is arranged to be positioned separated from the inner body part within a transport package, which provides the advantage that a very compact transport package may be provided, and further the advantage that the separate outer body part/s may be arranged to support some detail/s of the transport object during transportation.
  said outer body part is arranged with an angled support plank arranged to provide support during transport and also during pivoting of the transport object, which provides the advantage of ease of use.
  said coupling is arranged with a support shoulder arranged to assist in transition from the outer support surface of the inner body part and the outer support surface of the outer body part, which provides the advantage that an extra reliable and smooth pivoting may be achieved also when pivoting on different levels are involved.

Further advantages may become apparent from the detailed description below.

BRIEF DESCRIPTION OF THE FIGURES

In the following the invention will be described more in detail with reference to the enclosed figures, wherein.

DETAILED DESCRIPTION

Figure 1:
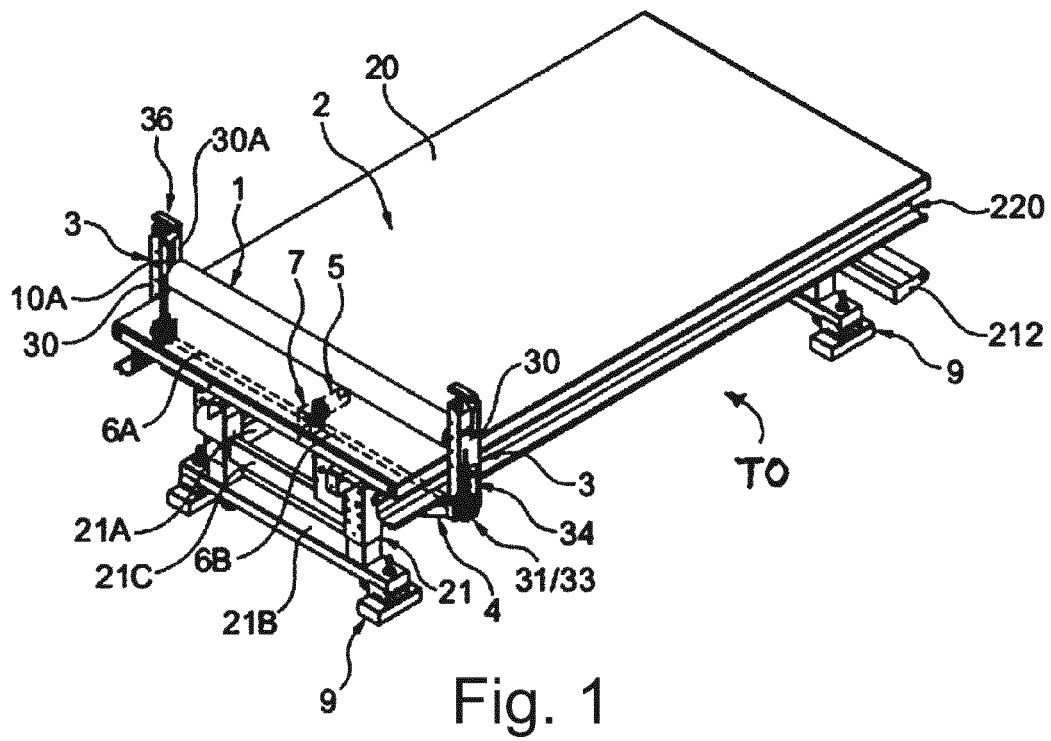
FIG. 1 shows a perspective view from above of a flatbed applicator that may be handled by means of a transport aid according to one embodiment of the invention.
Figure 2:
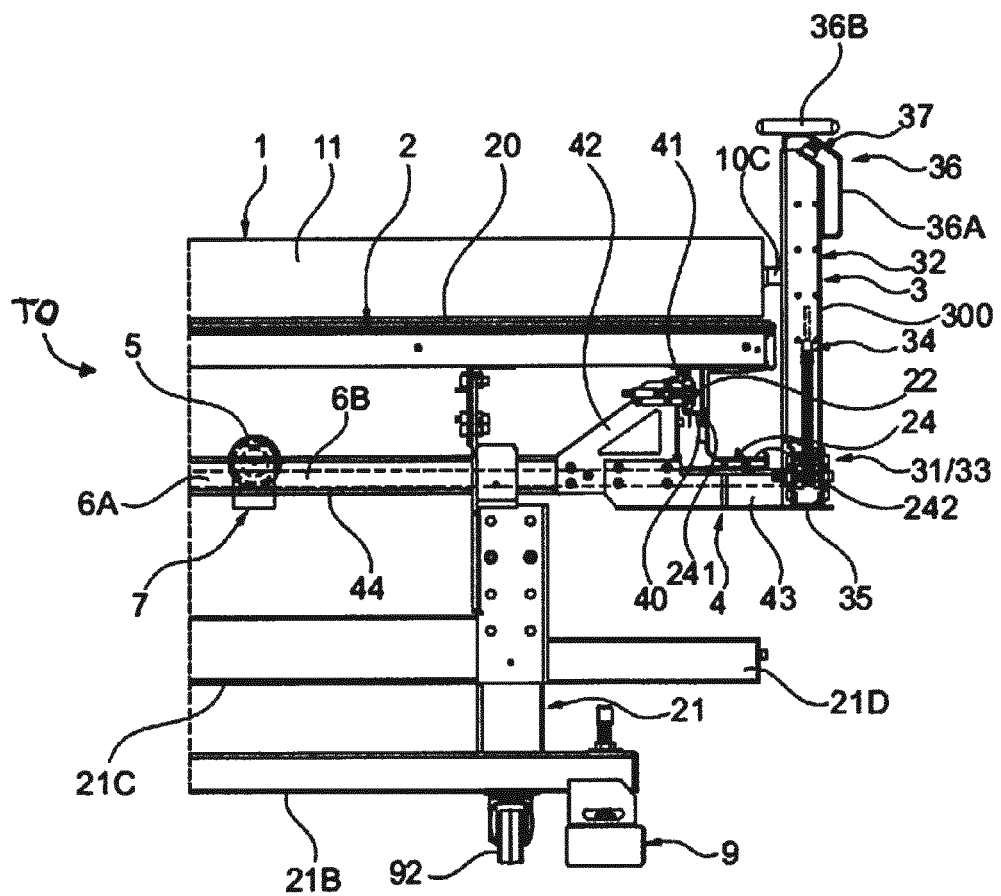
FIG. 2 is a side view of the embodiment in FIG. 1.

In FIGS. 1 and 2 there is shown a side view and a perspective view of an exemplary transport object TO, in the form of a flatbed applicator that may be handled by means of a transport aid arrangement according to the invention.

There is shown schematically a flatbed applicator table 2, with a movable roll 1 carried by post members 3, which in turn are carried by a movable support structure 4. The flatbed applicator table 2 is supported by a leg arrangement 21 with feet 9, wherein the leg arrangement 21 preferably includes an adjustable structure enabling adjustable distance between the table 2 and the feet 9 (preferably remotely) that may be used to move the whole flatbed applicator table up and down.

The shown leg arrangement 21 includes longitudinal 21A and transversal support beams 21B, 21C. Further a roll holder 21D, for an extra roll may be attached to the leg arrangement 21. Two longitudinal supporting beams 22 are attached underneath the table 2 adjacent each longitudinal side of the table 2. On to, preferably at the inside of, the longitudinal supporting beams 22 there are arranged two fixed parallel profiles 40 providing a fixed support for linear, horizontal movement of guide members 41 for a support structure 4 carrying post members 3. Further, the longitudinal supporting beams 22 carry longitudinal shelf members 24, which are L-shaped having one of the legs 241 extending in a vertical direction, which leg 241 is fitted to the longitudinal supporting beams 22 and a horizontal leg member 242 extending towards the long side edge of the table 2 in a horizontal plane. The fixed parallel profiles 40 preferably have a C-shape, wherein the openings of the two fixed parallel profiles 40 are positioned facing each other. On each side there is preferably arranged a longitudinally distanced, pair of guide units, wherein each guide unit comprises two horizontally off set guide members 41, arranged to enable an adjustable clamping pressure within said fixed parallel profiles 40.

On each side of the table 2 there is one post member 3, which thanks to the support structure 4 and the horizontal guiding structure 40/41 is linearly, horizontally moveable along the table 2. Within each post member 3, there is arranged a vertically moveable support structure 34. Each vertically moveable support structure 34 supports one end 10A, 10C of a shaft 10 that carries a roll 1. A motor 5 is arranged under the table 2, which via two shafts 6A, 6B (or alternatively one integral shaft) drives the vertically moveable support structure 34 for vertical displacement of the roll 1.

A mechanical arrangement 31, 33 transmits the torque from the shafts 6A, 6B to each vertically moveable support structure 34. The roll 1 has an outer surface 11 intended to be in contact with an object (not shown) positioned on the upper surface 20 of the table 2 in connection with performing lamination.

Each post 3 has a vertical guiding arrangement 30, preferably in the form of or supported by a housing 300 that extends vertically upwardly along the posts 3, e.g. including a vertically extending slot 30A for through passage of the shaft ends 10A, 10C into the interior of the post members 3, thereby enabling vertical movement in relation to the table 2 and housings 300.

Further FIGS. 1 and 2 shows that the upper end of each post 3 there are arranged handle means 36, to provide for easy movement of the roll 1 along the table 2. In a preferred embodiment there are multiple handles, e.g. a first handle 36A providing a vertically extending gripable part and one second handle member 36B providing a horizontally gripable part. In the preferred embodiment at least one activation device 37 is positioned nearby the handle device 36, to provide for easy activation of the motor 5, via a control unit (not shown) to either lift or lower the roll 1.

In a preferred embodiment the post members 3 together with the roll 1 maybe be pivoted around an axis that is coaxial with the axis of the drive shaft/s 6 of for the vertically movable member 34. Bearings (not shown) may be arranged fixed to the housing 300 providing the possibility to pivot the posts 3 together with the roll 2, 90 degrees between an upright vertical position and a horizontal position. Thanks to this design option many advantages may be obtained. It provides the possibility of pivoting the posts 3 and the roll 2 to have the whole table 2 as a working surface without any influence of the roll or the posts. A further evident advantage is that in the horizontal position when the roll 2 is positioned along a short end side on the table 2 a much more compact unit may be achieved, e.g. in connection with transport.

Figure 3:
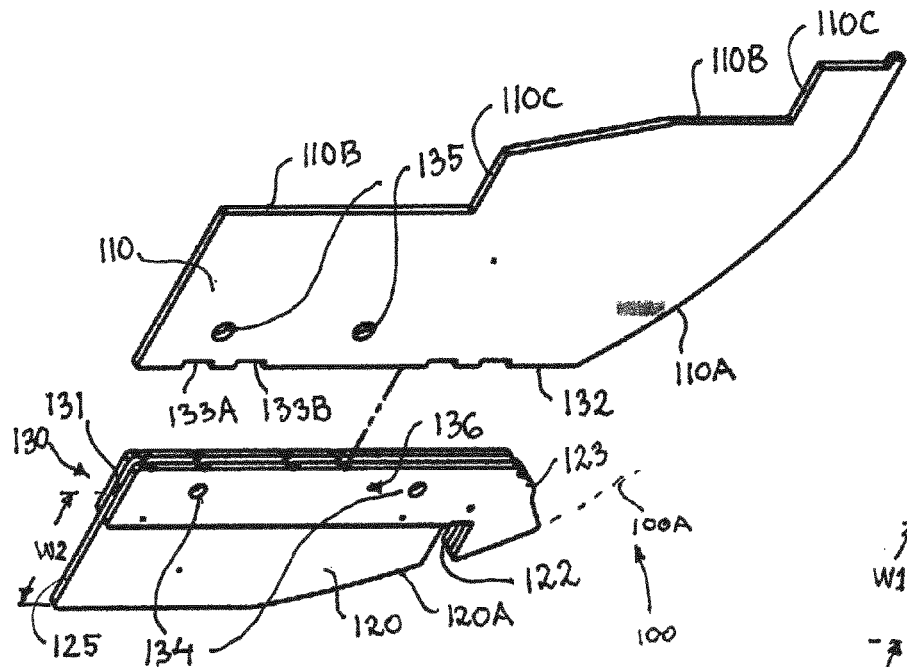
FIG. 3 is a perspective view of chosen parts of a preferred embodiment of the invention, wherein the outer and inner body parts are not yet interconnected.
Figure 4:
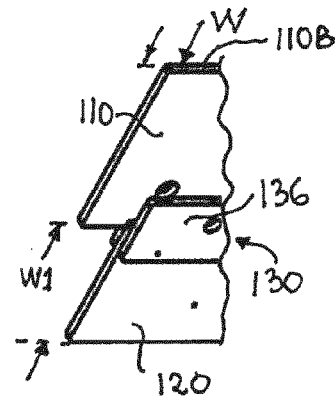
FIG. 4 is a partial view of the interconnected parts.
Figure 5:
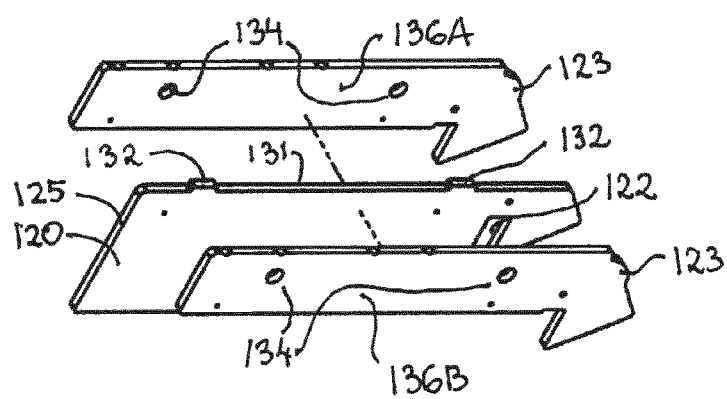
FIG. 5 is a perspective and exploded view of an outer and inner body part according to a preferred embodiment of the invention, and, FIG. 6 is a perspective view of a flatbed applicator in a transport package including a preferred solution according to the invention, before unpacking.

In FIGS. 3, 4 and 5 a preferred design of some basic parts of a transport aid arrangement according to the invention is shown.

The basic structure of the transport aid arrangement of the invention includes at least one support body 100 that is arranged with a curved support surface 100A. The basic principle of the invention resides in using that support body 100 having such a curved support surface 100A and gravity in order for an object to easily be pivoted or rather turned from a basically vertical orientation to horizontal orientation. Hence, the support body 100 is intended to aid in changing the position by 90° of objects. The invention is especially intended to be of help in connection with transport of objects TO that in a first phase need to be in a first position that is 90° off from the position of the object in its intended user position. The invention may be beneficial to use especially in regard of objects having a table structure with legs of various kinds, wherein the horizontal extension in its user position is much larger than its vertical extension, i.e. having a table surface that is longer and wider than the height of the feet on which the table rests.

One specific such object is referred to above, i.e. a flatbed applicator. In connection with transport of such flatbed applicators it is preferred, due to logistic requirements, to have the table surface in a vertical position, e.g. to better fit into spaces for instance, but also due to the fact that door openings normally are much higher than wide.

By means of the invention an object (TO) may more easily be transported in and out of different spaces with their shortest horizontal part (in use) oriented vertically and their longest horizontal part extending longitudinally, enabling it to be easily moved manually into its intended user position by having it supported by the support body 100 and then pivoted into its intended user position along the curved support surface 100A.

The invention will be descried in its most preferred embodiment wherein the support body 100 is divided into at least two parts 110, 120, in order to decrease the width w of a transport package 200 (see FIG. 6) including the object TO in the form of a flatbed applicator.

As shown in the FIGS. 3, 4 and 5, the body 100 is divided into two separate body parts 110, 120, one inner body part 110 and one outer body part 120. The inner body part 110 is arranged with a first sub section/portion 110A of the curved support surface 100A and the outer support body 120 is arranged with a second sub section/portion 120A of the curved support surface 100A. A coupling member 130 is arranged between the two body parts 110, 120 to enable coupling of the two body parts 110, 120 to interconnect with each other, thereby providing the possibility to create various distances between an inner support surface 110B and an outermost part of the support body 100.

Thanks to this arrangement the outer body part 120 may be positioned within the outer frames of the transport package 200 (see FIG. 6) such that the width w of the transport package 200 is minimized to adapt to the width of the object and other parts of the object in its most compact format, since the width of outer body part 120 will have no influence on the total width w of the transport package 200, i.e. during transport of the object TO. When packing a flatbed applicator this width w correspond to slightly larger than the lowest height of the table 2 in its user position wherein the leg arrangement 21 has been set in its lowermost position, i.e. where the table 2 is positioned as low as possible above the ground. It is to be understood that generally a flatbed applicator, and also other table devices that are used for interaction with humans will normally have an adjustable leg arrangement providing the possibility to position the table at different heights.

As shown in FIG. 4 the width W1 of the inner body part 110 may then, thanks to using two separate body parts, be chosen to be substantially smaller than the total width W of the curved support surface 100A, e.g. about half of the total width W of the curved support surface 100A. The width W1 of the inner body part 110 is preferably chosen such that it extends less than the feet when the leg arrangement 21 has been set in its most retracted/lowermost position. Hence, the total width W of the support body 100, when the outer body part 120 is coupled to the inner body part 110, may then be much larger than the width w of the transport package 200, wherein the added width W2 of the outer body part 120 together with the width W1 of the inner body part 110, creates the total width W.

The coupling 130 may be provided with at least one interfit member 133 that locks the body parts 110, 120 in desired interfit positions. Preferably there are arranged adjustable interfit members 133A, 133B, such that the outer support part 120 may be positioned in at least two different positions (as will be explained more in detail below). In the shown example in the figures, the coupling 130 includes a male interfit member 132 on an inner support surface 131 the outer body 120 that may interact with two differently positioned female members 133A, 133B at an outer support surface 132 of the inner support part 110.

As a consequence, the curved support surface portion 120A of the outer support part 120 may be positioned at two different levels/positions in relation to the inner support part 110. This arrangement provides the advantage that the curved surface portions 120A and 120B may be adapted to either fit to pivot the object TO along one and the same ground surfaces (being at the same level) or to pivot the object from an upper surface of a bottom part 201 of the transport package surface 200, i.e. enabling the second support surface portion 120A to provide support at a lower level, e.g. the floor on which the transport package 200 is positioned. The bottom part 201 may be in the form of a pallet. (see FIG. 6)

Furthermore, the coupling 130 may be arranged with overlapping parts 136 that provide transversal support for the body parts 110, 120. Further overlapping parts 136 may be interconnected to each other and a part in between by means of shaft members (not shown) introduced into corresponding holes 134, 135. The inner body part 110 is preferably arranged with perpendicularly arranged support surfaces 110 B, 110C that may assist in transferring load in more than one direction. At least on first support surface 110C may assist during transport to transfer load/provide support along a vertical plane, i.e. to transfer load down to the bottom part 201 of the transport package 200. Perpendicularly arranged in relation to said first support surface 110C, the inner body part 110 is preferably also arranged with a second support surfaces 110B may assist to transfer load from the object down onto the curved support surface 100A during pivoting of the object TO.

In the preferred embodiment the overlapping member 136 is in the form of two parallel plates 136A, 136B that are fixedly attached to the outer body part 120. The plates 136A, 136B are positioned along the inner edge 131 of the outer body part 120 and extend across the edge 131 to provide support laterally between the outer and inner body parts 110, 120. By means of arranging holes 134 in the plates 136A, 136B and matching differently positioned position holes 135 in the inner body part 110, the outer part 120 may be locked into different positions, e.g. by matching the male member 132 with a desired alternate female member 133, in relation to the inner body part 110. The main part of the forces that during the final stage of pivoting are transferred from the inner body 110 to the support surface portion 120A of the outer body part 120 are transferred via the outer edge 132 of the inner body part 110 to the inner edge 131 of the outer body part 120 and then via the outer curved support surface portion 120A of the outer body part to the floor.

According to a preferred embodiment the outer body part 120 may also assist in supporting one or more details of the object TO to be transported within the transport package 200. As indicated in the figures there may therefore be arranged a support groove 122 on the outer body part 120, which support groove 122 may be pushed onto a detail of the object such that during transport the outer body part 120 may assist in providing support to stabilize the object within the transport package.

As shown in FIGS. 3 and 5, the outer body part (120) is arranged with a lower support surface (125) and an upper support member (122), arranged to provide support for a detail of the transport object (TO) during transport. The coupling (130) is arranged with a support shoulder (123) arranged to assist in transition from the outer support surface portion (110 A) of the inner body part (110) and the outer support surface portion (120A) of the outer body part (120).

Figure 6:
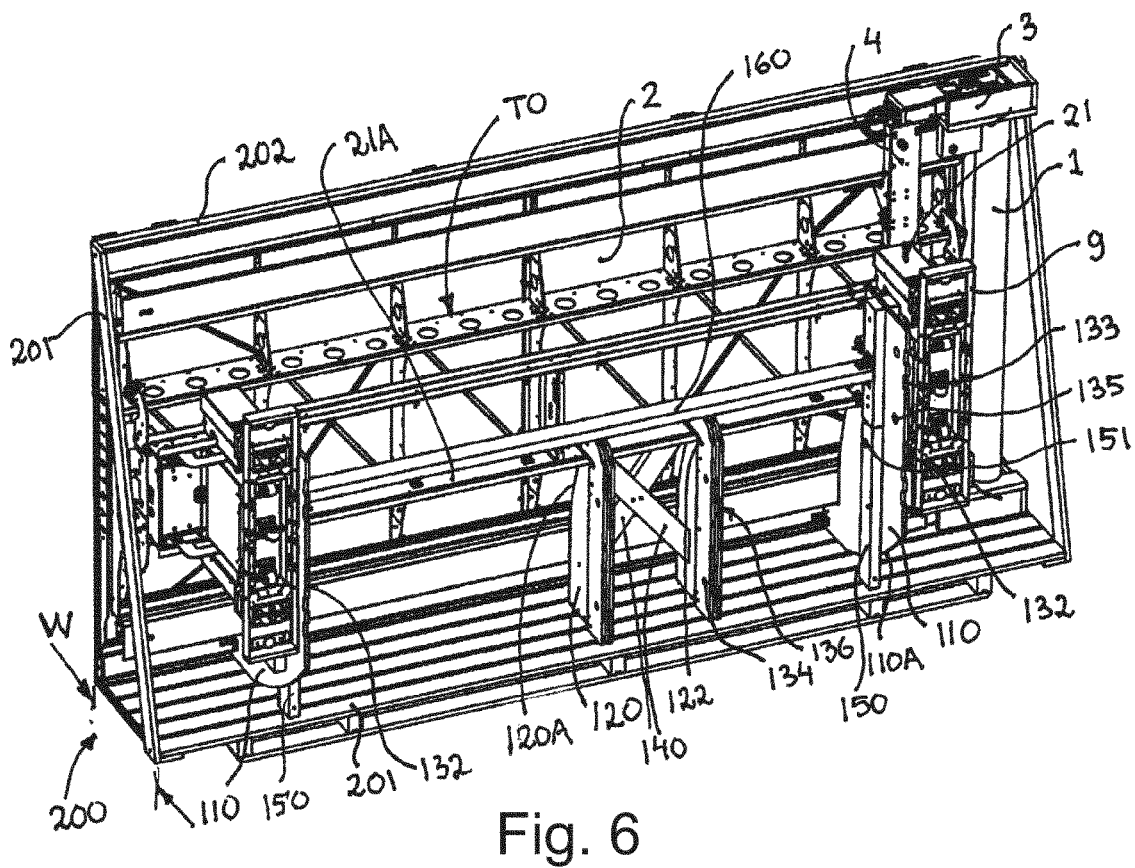

In FIG. 6 there is shown an embodiment of the invention where a transport object TO, in the form of a flatbed applicator, is positioned within a transport package 200. The transport package 200 has at bottom 201 that is in the form of a pallet. At the short side ends there are protective and supporting ribs 201 and along one long side there is a protective layer 202 that protects the upper surface of the table 2. The transport package 200 has a height H that is substantially larger than the width w of the transport package 200. The inner and outer body parts 110, 120 are positioned within transport package 200 having one edge in contact with the bottom 201 and another part connected to the transport object TO to provide support during transport. A lower edge of the long side of the table 2 will rest on the bottom 201 and the centre of gravity of the transport object TO is positioned between the table 2 and the feet 9, such that gravity urges the transport object TO with a pivoting force in the direction of the feet 9.

In the exemplary embodiment shown in the figures the inner body part 110 is positioned in contact with the leg arrangement 21 to provide support at that position. A longitudinally arranged plank 160 is arranged between the two inner body parts 110 to stabilize them. The two outer body parts 120 are positioned more centrally to provide support centrally. The outer body part 120 also hinder pivoting of the transport object TO by means of its groove 122 that supports a longitudinal beam 21A included in the support structure of the leg arrangement 21 of the flatbed applicator. Between the two outer body parts 120 there are arranged angled support blanks 140 to stabilize them. Moreover, there are pivotable planks 150 attached to each inner body part 110, at upper pivot points 151. These pivotable planks 150 also assist in hindering the transport object TO to pivot in the direction of the curvature, by means of having the lower end resting at an outer position on the bottom part 201.

During transport the leg arrangement 21 has been retracted as far as possible. The feet 9 on the leg arrangement 21 are therefor as close to the table 2 as possible. Thanks to having divided the pivoting body 100 the inner body part 110 may be fitted into the transport package 200 to not extend further out then the feet 9. Thanks to this aspect of the invention the transport aid arrangement according to the invention will not create any bulkiness of the transport package 200 but fit into it within its needed frames and as an add on (prior to the actually pivoting) provide extra support during transport.

Figure 7:
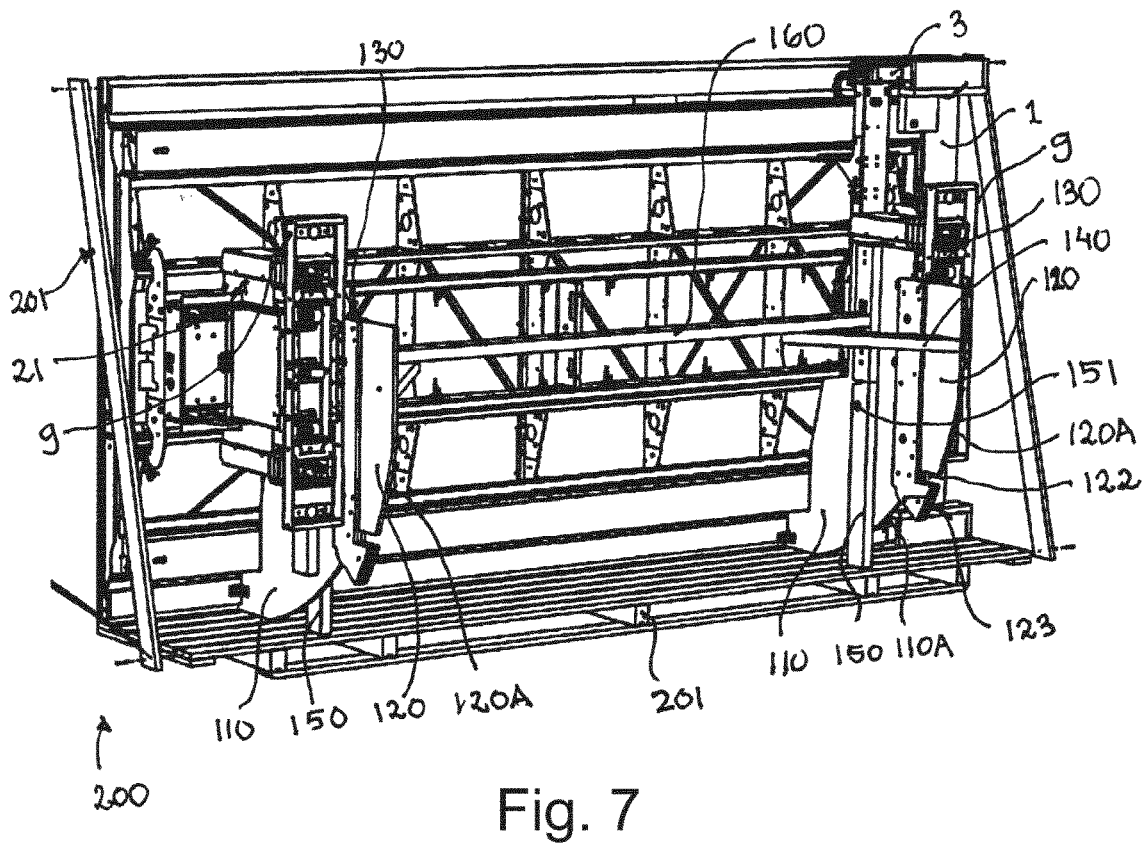
FIG. 7 shows a first subsequent stage of the unpacking.

In FIG. 7 it is indicated a subsequent step when unpacking the transport package 200. First the outer body parts 120 are detached from the transport package 200 and also the interconnected angled support planks 140.

Now each one of the outer body parts 120 may be fitted into a desired position onto the outer edge 132 of the inner body part 110. The interfit between the inner and outer body parts 110, 120 is achieved in a manner as has been described above, i.e. by means of using the coupling 130. In the shown embodiment the outer body part 120 is positioned such that it's male member 132 is fitted in a lower most female member 133 B at the inner the body part 110 such that the curved surface portion 120A of the outer body part 120 will be further out than the curved surface portion 110A of the inner body part 110. To stabilize the outer body parts 120 the angled support blank 140 are attached to the longitudinal plank 160.

Now when the outer body parts 120 have been securely attached in a desired position onto the inner body parts 110 the next step may be undertaken to prepare for pivoting the transport object TO into its user position. Firstly, then the short side frames 201 are removed, since these short side frames 201 include planks that will stabilize and hinder pivoting of the transport object TO in relation to the bottom 201. Still, the transport object TO will be safely held in a vertical position due to the fact that the pivotable planks 150 hinder pivoting of the transport object.

Figure 8:
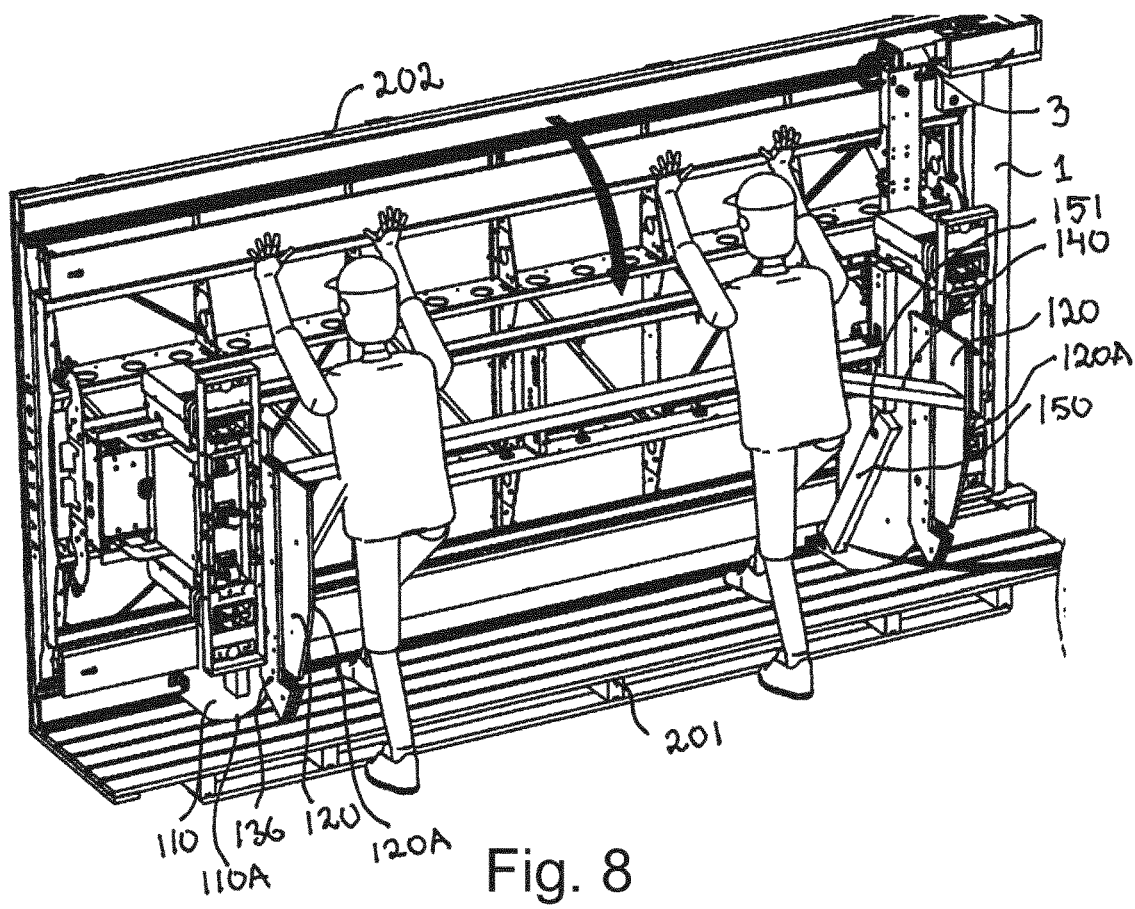
FIG. 8 shows a second subsequent stage of the unpacking.

In a subsequent step, as shown in FIG. 8, the transport object TO is ready for being pivoted into its user position. This is achieved by two persons cooperating by firstly pivoting the pivotable planks 150 into a non-hindering position, i.e. by pushing (e.g. by a foot) the lower end of the pivotal planks 150 inwardly towards the table 2. In this phase the gravity of the transport object will assist in providing a pivoting force towards the place where the assisting persons are positioned. Thanks to preferably arranging the inner part of the outer surface portion 110A of the inner body part 110 substantially straight-lined, the transport object may still be stable in its vertical position. Accordingly, there may be need of a slight pull from the persons assisting in the pivoting to make the transport object start pivoting against them.

During a first phase the transport object TO will then pivot and be supported by the outer curved surface portion 110A of the inner body part 110. At a position of about 45° of the table 2 the inner body part 110 has been pivoted such that its outer end of the curved surface portion 110A, adjacent the coupling 130, will be positioned at the side edge of the bottom 201. Thanks to the fact of having positioned the outer part 120 displaced downwardly in relation to the inner body part 110 the start of the outer curved surface portion 120A of the outer body part 120 will now be in level with the floor on which the bottom 201 stands. Accordingly, there will be a smooth transition when the outer body part 120 starts to transfer load from the transport object TO to the floor/ground, despite the difference in height between the upper surface of the bottom 201 and the floor/ground on which the bottom 201 rests.

Figure 9:
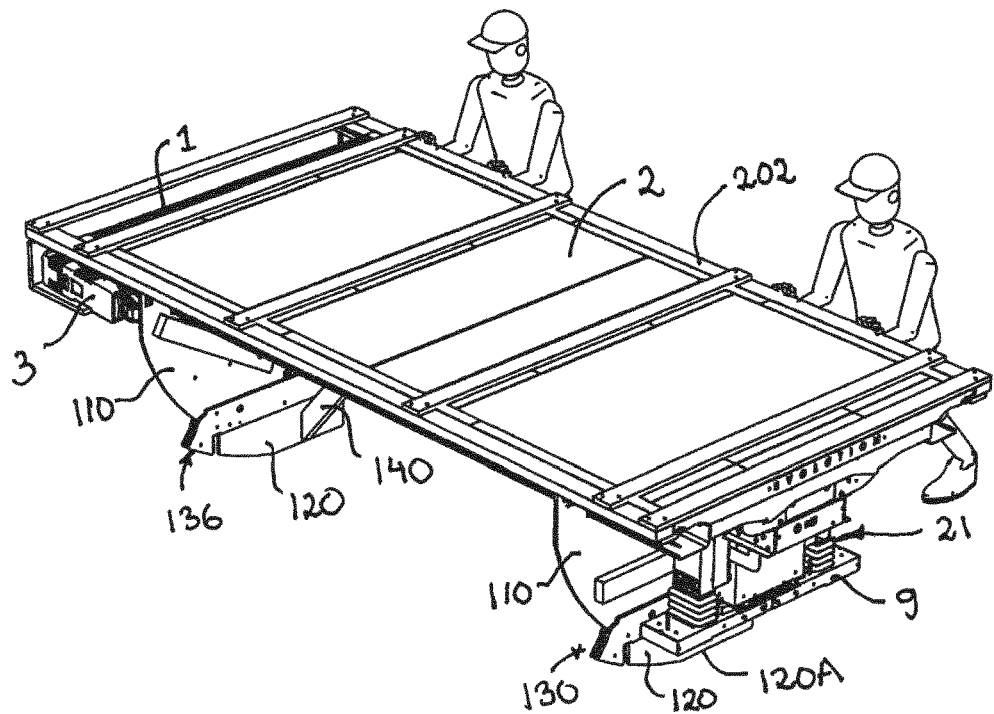
FIG. 9 shows a third subsequent stage of the unpacking.

In a subsequent phase the pivoting will continue and enable the persons to smoothly follow the pivoting of the transport object into its intended horizontal position of the table 2 as shown in FIG. 9. Once in this position there is no further need of the pivot assisting body parts 110, 120, 130 and it is therefore time to remove them.

In FIG. 9 it is shown that in use of transport object having an adjustable leg arrangement 21 it is easily achieved to remove the pivoting body parts 110, 120, 130 by first operating the adjustable leg arrangement 21 such that the feet 9 will be moved past the extension of the body parts 110, 120, 130. Accordingly, in a subsequent phase the transport object will merely rest on the feet 9 of the transport object TO. Now the body parts 110, 120, 130 may easily be removed by pulling them out sideways, preferably by use of maintaining interconnection between the two parallel body units by means of the interconnecting planks 160, 140. In this stage in many applications the unpacking procedure is more or less terminated once also the side support 202 has also been removed.

Figure 10:
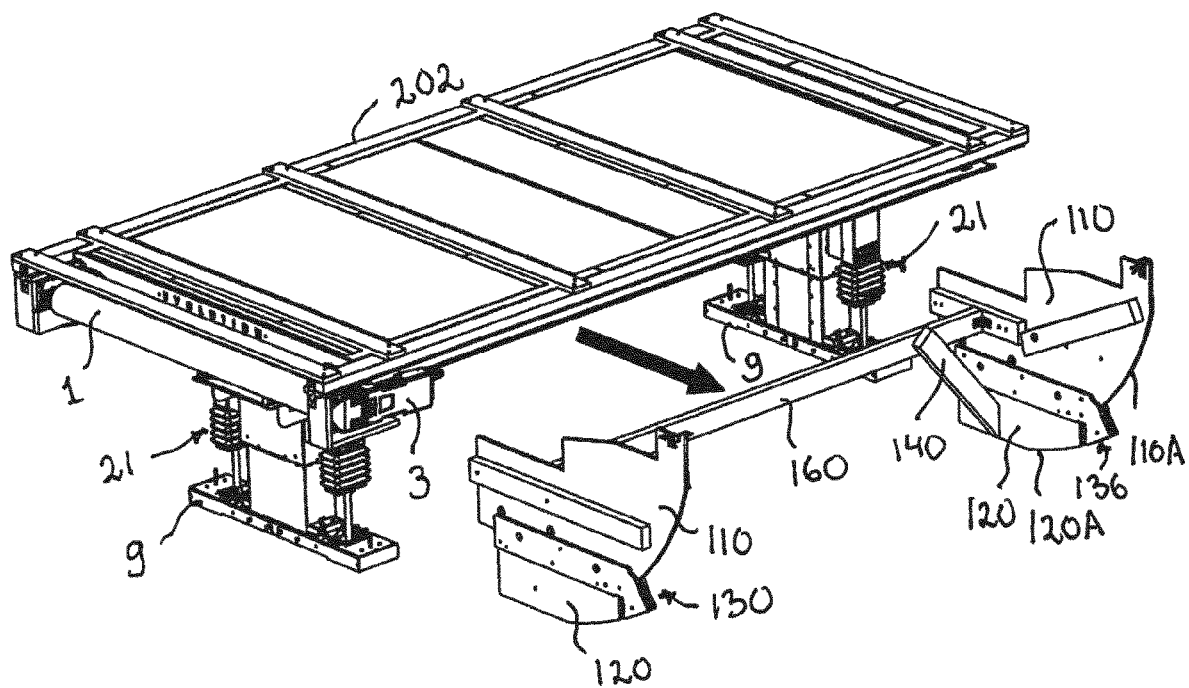
FIG. 10 shows a fourth subsequent stage of the unpacking.
Figure 11:
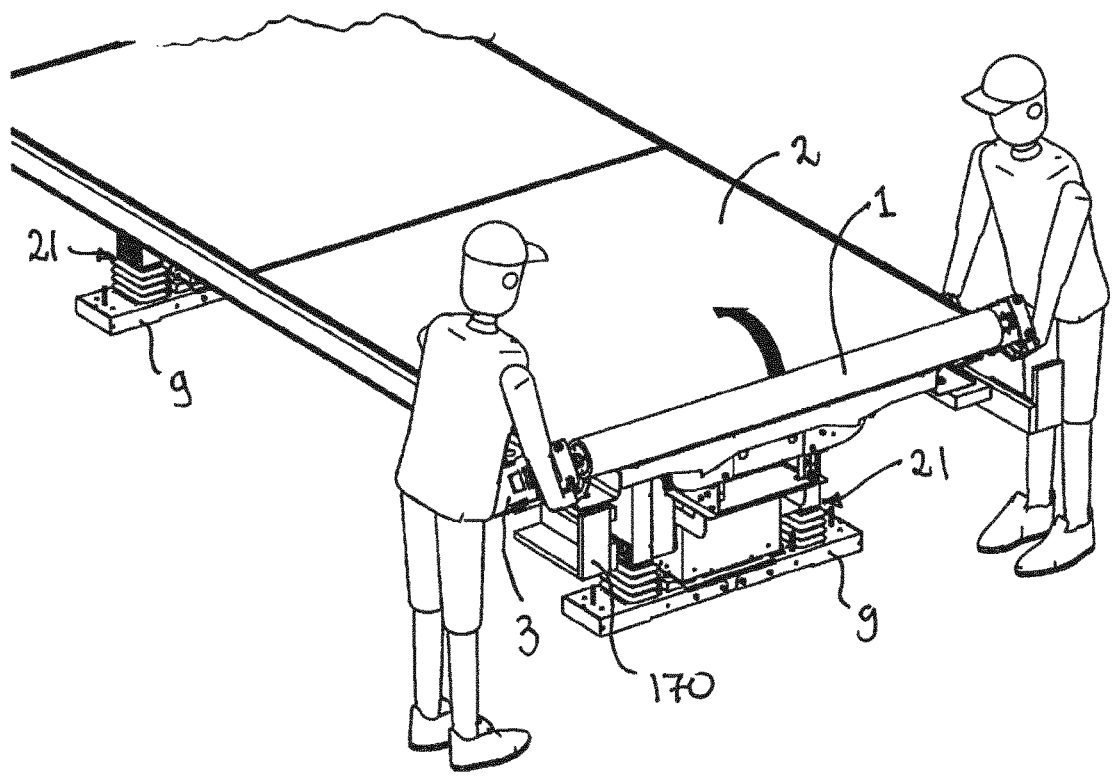
FIG. 11 shows a near final stage of the unpacking.

As shown in FIGS. 10 and 11 the invention is especially suitable for a flatbed applicator where the roll 1 is arranged to be pivotable, by means of pivoting the vertical posts 3.

Thanks to this arrangement the roll 1 and the posts 3 will not create any extra space requirement in the width dimension of the transport package that is mostly the limiting parameter, i.e. the width w of the transport package 200.

In FIG. 11 it is shown that in a final stage when unpacking a flatbed applicator according to a preferred embodiment of the invention the posts 3 together with the roll 1 is pivoted into its intended vertical user position, wherein also specific support members 170 are firstly removed.

As is evident from above the invented concept is not limited to use for transport objects in the form of flatbed applicators but may be used to assist in transporting various transport objects, e.g. pool tables, pianos etc wherein there is a need of pivoting the transport object 90° from its intended user position, to provide a more compact transport package 200. Furthermore it is evident that in use of the inventive concept, especially in connection with less heavy objects, it may be sufficient to use merely one set of inner and outer body parts 110, 120 and likewise if really heavy articles are moved there may be a need of more than two inner and outer body part units.

Thanks to the arrangement according to the invention numerous advantages may be achieved. The invention may be modified in many ways in relation to what is shown in figures without departing from the basic concept of the invention. For instance, it is foreseen that the pivot body may be divided into more than to body parts, e.g. three or four, I there is a need for more compactness.

The invention claimed is:

1. A transport aid arrangement, comprising:
at least one support body having at least one inner support surface and provided with a curved outer support surface arranged to be attached to a transport object enabling controlled pivoting of the transport object along said curved outer support surface from a vertical position into a horizontal position, wherein the support body creates a distance between said at least one inner support surface and an outer part of said curved outer support surface, wherein said support body is divided into at least two body parts, an inner body part and an outer body part each provided with a portion of said curved outer support surface, said at least two parts being releasably connectable with each other by means of a coupling, wherein the width from an inner support surface of said inner part to the outer portion of said curved outer support surface portion of said inner part is substantially less than the total width between said at least one inner support surface to the outer portion of said curved outer support surface portion of said outer body part, when the outer body part is coupled to the inner body part forming said curved outer support surface.

2. The transport aid arrangement according to claim 1, wherein said coupling is arranged with a plurality of interfit members that enables the outer body part to be attached to the inner body part in at least two different positions.

3. The transport aid arrangement according to claim 1, wherein said coupling comprises two parallel plates extending laterally in relation to a first support edge of the outer body part and that the inner body part is arranged with a plate-like structure intended for interaction with said parallel plates and an adapted second support edge arranged to interact with said first support edge, whereby the coupling provides a lateral support between the inner and outer body parts along a dividing line of the two body parts.

4. The transport aid arrangement according to claim 1, wherein said body parts are plate-shaped, preferably made of some kind of wooden material.

5. The transport aid arrangement according to claim 4, wherein said coupling is arranged with a support shoulder arranged to assist in transition from the outer support surface portion of the inner body part and the outer support surface portion of the outer body part.

6. The transport aid arrangement according to claim 1, wherein said outer body part is arranged to be positioned separated from the inner body part within a transport package.

7. The transport aid arrangement according to claim 6, wherein said outer body part is arranged with a lower support surface and an upper support member, arranged to provide support for a detail of the transport object during transport.

8. The transport aid arrangement according to claim 6, wherein said outer body part is arranged with an angled support plank arranged to provide support during transport and also during pivoting of the transport object.

9. A method for use of transport aid arrangement according to claim 1, together with a transport package including a transport object, comprising the steps of:
a) positioning the transport object in a vertical position, 90° off from its intended user position into a transport package, preferably onto a bottom thereof,
b) arranging a protective and stabilizing frame to secure the transport object in its intended transport position,
c) attaching at least one inner body part in position within the transport package such that support surfaces of the inner body part is in supportive contact with the transport object,
d) positioning at least one outer body part at a desired position within the transport package,
e) transporting the transport object within the transport package to an intended user position,
f) attaching the at least one outer body part into a desired position onto the inner body part,
g) removing a pivot stabilizing part of said protective and stabilizing frame, and
h) pivoting a hindering pivotable plank attached to the inner body part into a non-hindering position and allowing the transport object to pivot down to its intended user position.

10. The method according to claim 9, further comprising arranging the outer body part to assist in stabilizing a detail of said transport object during transport.

11. The method according to claim 9, further comprising positioning said outer body part onto said inner body part to have the outer curved surface portion of the outer body part positioned at a lower level than the outer curved surface portion of the inner body part, and using the outer curved surface portion of the inner body part to be in contact with the bottom of the transport package and the outer curved surface portion of the outer body part to be in contact with the floor/ground for the intended user position of the transport object.

12. The method according to claim 9, wherein said transport object being a flatbed applicator, wherein preferably the roll of said flatbed applicator is pivotally arranged by means of pivotable posts enabling the roll to be positioned along a short end of the table.

\* \* \* \* \*